United States Patent
Prabhakar et al.

(10) Patent No.: US 10,401,934 B2
(45) Date of Patent: Sep. 3, 2019

(54) PROCESS-LEVEL ACTIVITY TAGGING

(71) Applicant: Microsoft Technology Licensing, LLC, Redmond, WA (US)

(72) Inventors: Sandeep Prabhakar, Bellevue, WA (US); Taofiq Ezaz, Redmond, WA (US); Cenk Ergan, Redmond, WA (US); Rico Mariani, Redmond, WA (US); Iulian Doroftei Calinov, Sammamish, WA (US); Brandon Michael Heenan, Seattle, WA (US); Vijay Sundaram, Kirkland, WA (US); Zachary Sandburg Holmes, Redmond, WA (US); Joshua Daniel Patterson, Seattle, WA (US); Samarth Harish Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/444,219

(22) Filed: Feb. 27, 2017

(65) Prior Publication Data

US 2018/0196487 A1    Jul. 12, 2018

Related U.S. Application Data

(60) Provisional application No. 62/445,212, filed on Jan. 11, 2017.

(51) Int. Cl.
*G06F 1/00* (2006.01)
*G06F 11/30* (2006.01)
(Continued)

(52) U.S. Cl.
CPC .............. *G06F 1/28* (2013.01); *G06F 1/3206* (2013.01); *G06F 11/3017* (2013.01);
(Continued)

(58) Field of Classification Search
CPC .... G06F 1/28; G06F 11/3096; G06F 11/3072; G06F 11/3024; G06F 11/3017;
(Continued)

(56) References Cited

U.S. PATENT DOCUMENTS 7,272,730 B1    9/2007    Acquaviva et al.
9,372,523 B2    6/2016    Furukawa
(Continued)

FOREIGN PATENT DOCUMENTS

WO    2012146821 A1    11/2012
WO    2013002871 A1    1/2013

OTHER PUBLICATIONS

Mittal, et al., "Empowering Developers to Estimate App Energy Consumption", In Proceedings of 18th Annual International Conference on Mobile Computing and Networking, Aug. 22, 2012, 11 pages.

(Continued)

*Primary Examiner* — Xuxing Chen

(57) ABSTRACT

Embodiments relate to enabling software to interface with a power consumption telemetry system. A process may have tagging instructions that interface with an energy estimation engine. While the energy estimation engine is logging energy consumption by the process, the process may also mark, tag, or otherwise delineate periods of processing during the execution time of the process. The logic of the process may determine how such periods should be labeled and when they being and end. The tagged periods are correlated with energy consumed by the process so that details of what the process was doing during different periods of energy consumption may be understood.

20 Claims, 9 Drawing Sheets

(51) Int. Cl.
*G06F 1/28* (2006.01)
*G06F 11/34* (2006.01)
*G06F 1/3206* (2019.01)

(52) U.S. Cl.
CPC ...... *G06F 11/3024* (2013.01); *G06F 11/3062* (2013.01); *G06F 11/3072* (2013.01); *G06F 11/3096* (2013.01); *G06F 11/3476* (2013.01); *G06F 2201/86* (2013.01); *G06F 2201/865* (2013.01)

(58) Field of Classification Search
CPC ............... G06F 1/3206; G06F 11/3476; G06F 11/3062; G06F 2201/865; G06F 2201/86

See application file for complete search history.

(56) References Cited

U.S. PATENT DOCUMENTS

| | | |
|---|---|---|
| 2006/0155415 A1 | 7/2006 | Lefurgy et al. |
| 2010/0180158 A1 | 7/2010 | Corry et al. |
| 2011/0040990 A1 | 2/2011 | Chan et al. |
| 2011/0072378 A1 | 3/2011 | Nurminen et al. |
| 2011/0191609 A1 | 8/2011 | Van bokhoven et al. |
| 2011/0191721 A1 | 8/2011 | Choi et al. |
| 2012/0011378 A1 | 1/2012 | Dalton et al. |
| 2012/0260111 A1 | 10/2012 | Tarkoma |
| 2013/0007255 A1 | 1/2013 | Gerber et al. |
| 2013/0231894 A1 | 9/2013 | Paakkonen et al. |
| 2015/0227445 A1 | 8/2015 | Arscott et al. |
| 2015/0377937 A1 | 12/2015 | Lafargue et al. |

OTHER PUBLICATIONS

"International Search Report and Written Opinion Issued in PCT Application No. PCT/US2016/015873", dated Apr. 30, 2018, 16 Pages.

PROCESS-LEVEL ACTIVITY TAGGING

REFERENCE TO RELATED APPLICATIONS

This application claims an invention which was disclosed in Provisional Application No. 62/445,212, filed Jan. 11, 2017, entitled "PROCESS-LEVEL ACTIVITY TAGGING". The benefit under 35 USC § 119(e) of the United States provisional application is hereby claimed, and the aforementioned application is hereby incorporated herein by reference.

BACKGROUND

Computing devices consume energy to operate. Components of computing devices such as processors, displays, buses, network interfaces, storage, etc., all consume energy. It is usually desirable to minimize the amount of energy needed by a computing device, for instance to extend battery life or to reduce the considerable amount of energy consumed by server farms. The software executing on a computing device largely determines how much energy will be consumed. The many design and engineering choices that are made to build a unit of software can significantly influence the amount of power necessary at any given moment. While efficiency in general is always helpful for reducing energy consumption, it can be difficult to predict how specific design and coding choices may affect power needs. The energy consumption of an application, for instance, can significantly depend on how the application is used, which particular hardware components are used, what other software is concurrently executing, etc. These variables are amplified when extended to a large population of devices executing a same piece of software. Modeling and study of individual devices has limits. Production feedback about power use can be helpful.

There are few tools to help software developers understand how energy is consumed when software is employed by diverse users for production, and there have been few tools that provide information about systemic energy consumption for a large population of devices. Some tools that provide production feedback have only provided per-application energy consumption information. Other tools have provided system-level information about how much energy is consumed by different types of work. Tools that provide code-level information about an application's energy consumption have been devised. However, these tools have relied on code analysis and energy modeling to predict energy consumption traits. Such tools have not been suitable for production settings and have been incapable of providing detailed information about how software consumes energy in production devices. Furthermore, no energy analysis tools have enabled the logic of applications to arbitrarily determine how and when energy consumption is measured. Energy consumption analysis has been modeled and measured in ways that are transparent to software that is being modeled or measured.

Techniques described below relate to enabling a software developer to customize how and when energy consumption is measured when an application is executing.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to enabling software to interface with a power consumption telemetry system. A process may have tagging instructions that interface with an energy estimation engine. While the energy estimation engine is logging energy consumption by the process, the process may also mark, tag, or otherwise delineate periods of processing during the execution time of the process. The logic of the process may determine how such periods should be labeled and when they begin and end. The tagged periods are correlated with energy consumed by the process so that details of what the process was doing during different periods of energy consumption may be understood.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
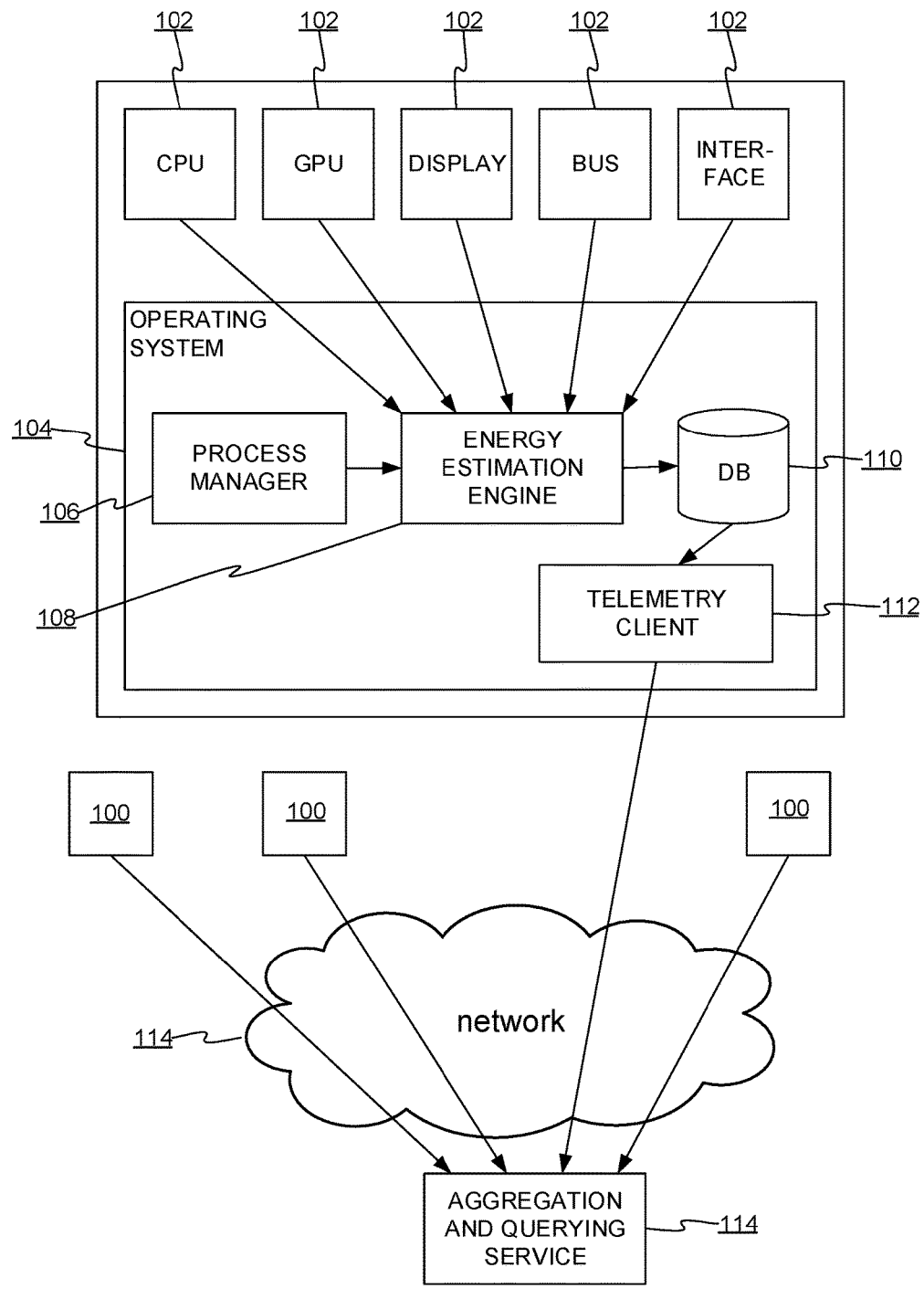
FIG. 1 shows a computing device configured to measure and report information about energy consumption.

FIG. 1 shows a computing device 100 configured to measure and report information about energy consumption. The computing device 100 may have one or more hardware components 102 such as a central processing unit (CPU), a graphics processing unit (GPU), a display, a bus, a network interface, and other types of well-known computing hardware. The computing device 100 also has an operating system 104 for coordinating use of the hardware. The operating system 104 may be any type of known operating system modified or augmented in ways described herein. As with most operating systems, the operating system 104 includes a process manager 106. The process manager 106 performs typical process management tasks such as process creation, process termination, tracking and managing process states, coordinating execution of processes, and managing a process table for these tasks, among other things.

The operating system 104 also includes an energy estimation engine 108. The energy estimation engine 108 receives power information from the process manager 106 and optionally from the hardware components 102. The energy estimation engine 108 uses the power information to estimate total energy consumption at regular intervals, estimate breakdowns of energy consumption by hardware device, process, application, or other components. The energy estimates are recorded to a database 110.

A telemetry client 112 periodically transmits the database 110 via a network 114 to an aggregation service 114. The aggregation service 116 is a network service that also receives energy telemetry data from other computing devices 100 that also execute energy estimation engines. The telemetry client 112 and aggregation service 114 may be implemented using known telemetry techniques or systems, but modified as necessary to report energy consumption data. The aggregation service 114 combines the energy telemetry data from the computing devices 100 into a global dataset. The combined energy telemetry data in the global dataset can be queried. Preferably, depending on the level of detail available and whether sensitive information is accessible, an application developer can only access the aggregated energy data relevant to that developer's software.

The energy estimation engine 108 can be implemented in many ways. For instance, the energy estimation engine 108 may run as a background process(es) with kernel-mode and user-mode components. In any case, the energy estimation engine 108 should be able to estimate and record how much energy is consumed by each process over increments of time. That is, power use is estimated and stored on a per-process basis as a function of time. Other power estimates may also be computed, for instance per-hardware component, energy consumed as a function of whether a display is on or off, energy consumed by a process broken down by hardware component, etc.

As noted, how energy consumption is estimated is not significant. In one embodiment, the energy estimation engine implements a mathematical model of energy supply and consumption. The model may take as inputs power data measured by or from one or more of the hardware components. In one embodiment, power measurements are continuously sampled at short intervals of time. The power samples may include power being provided by one or more power supplies (e.g., battery, line-in, solar element, etc.) and power being drawn by each of the hardware components. The model may have default parameters that can be tuned by device profiles from hardware vendors, chip manufacturers, etc. As noted, power measures may be snapshotted or sampled periodically. The power measures can be combined by the mathematical model to estimate energy consumption over different periods of time. In short, the energy estimation engine computes energy consumption as a function of time and at varying levels of detail.

In one embodiment, only (or at the least) CPU-related power data is captured and used to estimate energy consumption. At each sample point/interval, the process manager 104 may identify what proportion of CPU work (e.g., cycles) was divvied out to which processes. This information may be combined later with estimations of CPU energy consumption to estimate how much energy each process has used as a function of time. To estimate total (and/or CPU) energy consumption at a point in time (e.g., a most recent sample time), the mathematical energy model may require a series of recent power samples (CPU and/or other hardware components). Thus, estimation of per-process energy consumption may lag recent power measures. To account for this lag, the mathematical model may work with its own internal units—energy counters—that represent proportional power supplied and consumed. The proportional power can change from one sample period to the next. When samples are taken, these temporary proportional power estimates for respective elements (processes, some hardware components, etc.) are computed in the form of tokens or counters that represent proportional power at a slice of time. Some hardware components may have energy computed directly. When a total energy estimate becomes available for a sample period, the energy of each monitored element (process, hardware component, etc.) may be readily computed per its previously estimated ratio in the form of energy counters. This technique, which also reduces the computation load of energy estimation by allowing energy estimation to be performed intermittently, will be further explained below.

Although shown as a single unit in FIG. 1, the energy estimation engine 108 may be implemented with any type of architecture and breakdown of components. For example, there may be elements that facilitate inter-process communication such as remote procedure call (RPC) clients and/or servers, kernel modules for sampling power/load data (e.g., from drivers and the process manager 106) and a user-mode background process for implementing the mathematical energy estimation model, consuming power samples and energy counters, and outputting energy data to the database 110. Generally, techniques described herein may be used with any system capable of estimating how much energy and/or power is used on a per-process basis.

Figure 2:
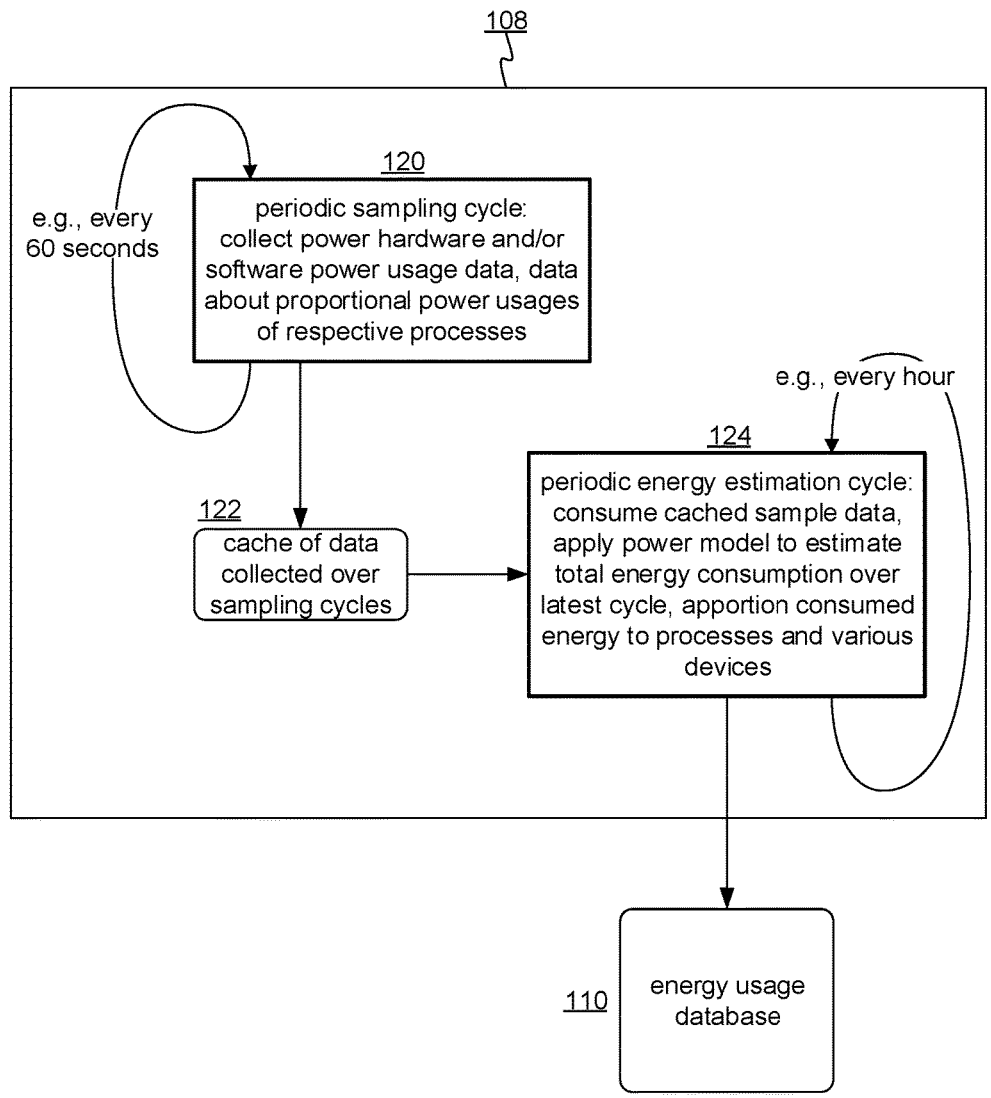
FIG. 2 shows details of an energy estimation engine.

FIG. 2 shows details of the energy estimation engine 108. The energy estimation engine has a sampling process 120 that samples power data over regular intervals such as each minute. At each sample interval, the sampling process 120 obtains power samples and computes energy counters for whichever elements are being monitored (e.g., individual processes, hardware components, etc.). The energy estimates are stored in a cache 122 as sequences of delta values. An energy estimation process 124 consumes the cache 122 at larger intervals, for instance every hour. The energy estimation process 124 computes the total energy values (e.g., system, hardware components) for the respective intervals in the cache 122. Pro-rata energy consumption for each element at each interval is computed per the energy totals for the intervals. The energy data is stored to the database 110.

As mentioned above, energy consumption can be broken down and associated in numerous ways. Energy may be estimated for each process. Processes may be uniquely identified by their process ID and a timestamp. A hash of this unique ID may be used as in index for the data in the cache 122 and the database 110. If other attributes of a process are tracked, such as image name, package name, etc., then a corresponding rich set of energy statistics at multiple levels of detail can be tracked. However, to track energy consumption at a granularity finer than the process level, additional techniques are used, as described with reference to FIG. 5.

Figure 3:
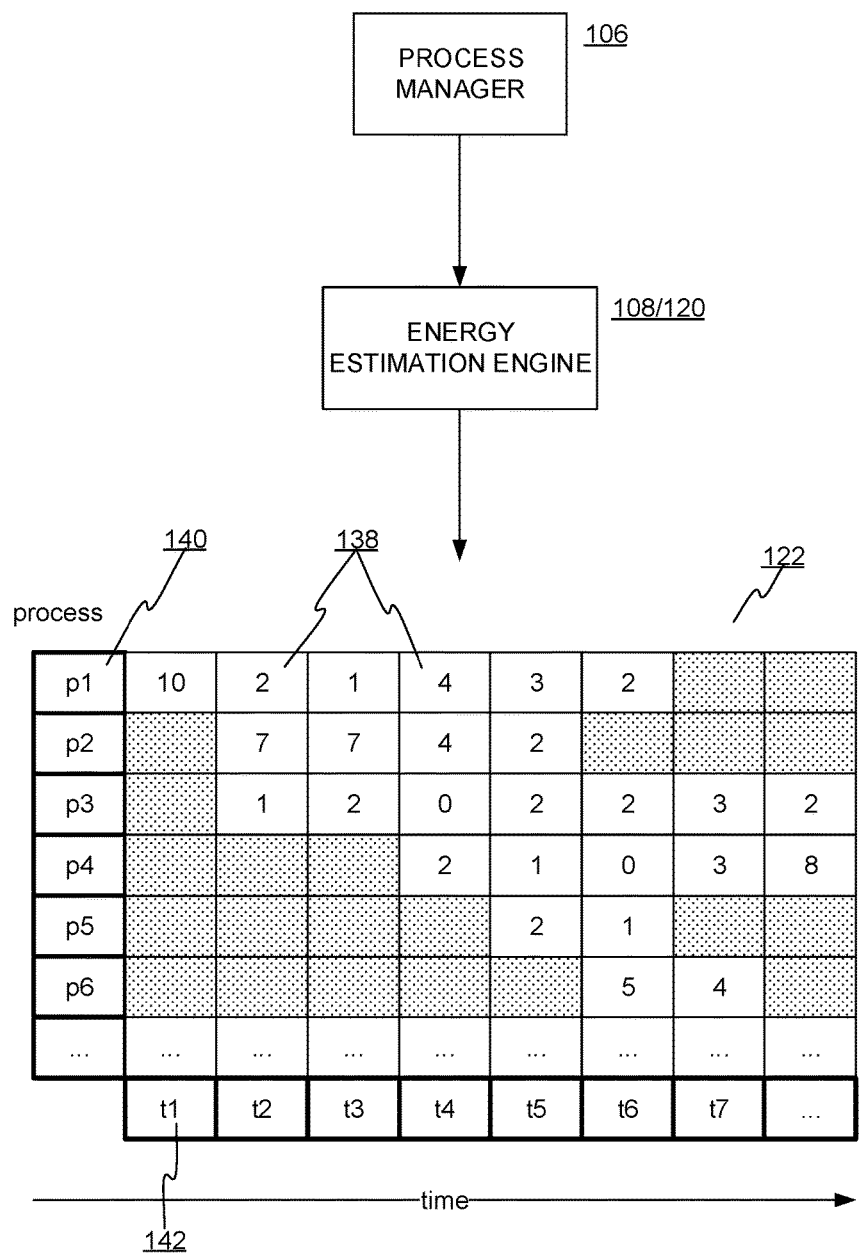
FIG. 3 shows an example of a cache.

FIG. 3 shows an example of the cache 122. The cache 122 is represented as a table, however, any data structure or combination of data structures may be used to index energy estimation counters 138 as a function of unique process IDs. For example, the cache 122 may be implemented as a hash table of pointers to trees. As mentioned above, energy counters represent proportional energy consumption. Thus, at each sample time 142 the sum of counters should be the same; in the example of FIG. 3 the sum is ten. In other embodiments the total of counters per period may vary (in correspondence with CPU load) even as the power they represent per-counter also varies. At time t1 only process p1 is executing and all CPU energy for the preceding interval is allocated to process p1. At time t2, processes p2 and p3 have begun and the CPU load is distributed among processes p1, p2, and p3, proportionally, at 20%, 70%, and 10%, respectively. As time progresses some processes end and others are created.

Figure 4:
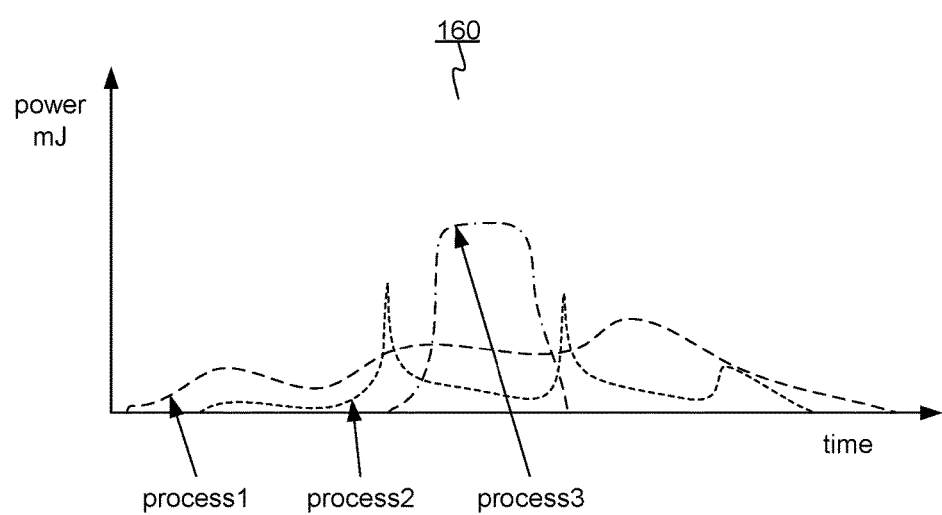
FIG. 4 shows a graph representing an example of estimated energy consumption of three processes over time as stored in a database.

When the energy estimation interval ends, the energy estimation process 124 computes the energy consumption values, for instance in millijoules (mJ), for each process at each sample interval (t1, t2, . . . ). For example, if time t4 has a total of 500 mJ, then processes p1, p2, p3, and p4 would be recorded as having consumed 200 mJ, 200 mJ, 0 mJ, and 100 mJ, respectively. FIG. 4 shows a graph 160 representing an example of estimated energy consumption of three processes over time as stored in the database 110. The sum of the values of the processes at any given point in time varies and is the total energy consumed by the processor and/or the computing device (depending on implementation).

As described above, the energy estimation engine 108 computes a running estimate of energy consumption on a per-process basis in a way that is transparent to processes. The energy use of any arbitrary process may be estimated without requiring any special action by the process; application source code and/or executable code do not need to be modified or specially instrumented to estimate energy consumption. Energy consumption of any arbitrary process can be estimated. However, some processes may run for long periods of time, perform many diverse tasks, and handle diverse types of information. The internal logic and behavior of a process may have a significant correlation with power consumption of the process. Some tasks of a process may require more power than others, and some information may require more energy to process than other information.

For example, if a process is the loaded executable code of a web browser application, how the browser consumes energy may vary significantly from one website to the next. If the process is an audio renderer, for example, which audio effects are applied might vary from one audio stream to the next. Any variable behavior or data of a process might be significant to understanding energy consumption. However, previously, insight into what a process is doing or what information it is handling as it consumes energy has not been possible. That is, it has not been possible to correlate, in a flexible process-controlled way, internal process state and behavior of a process with the process's energy consumption.

Figure 5:
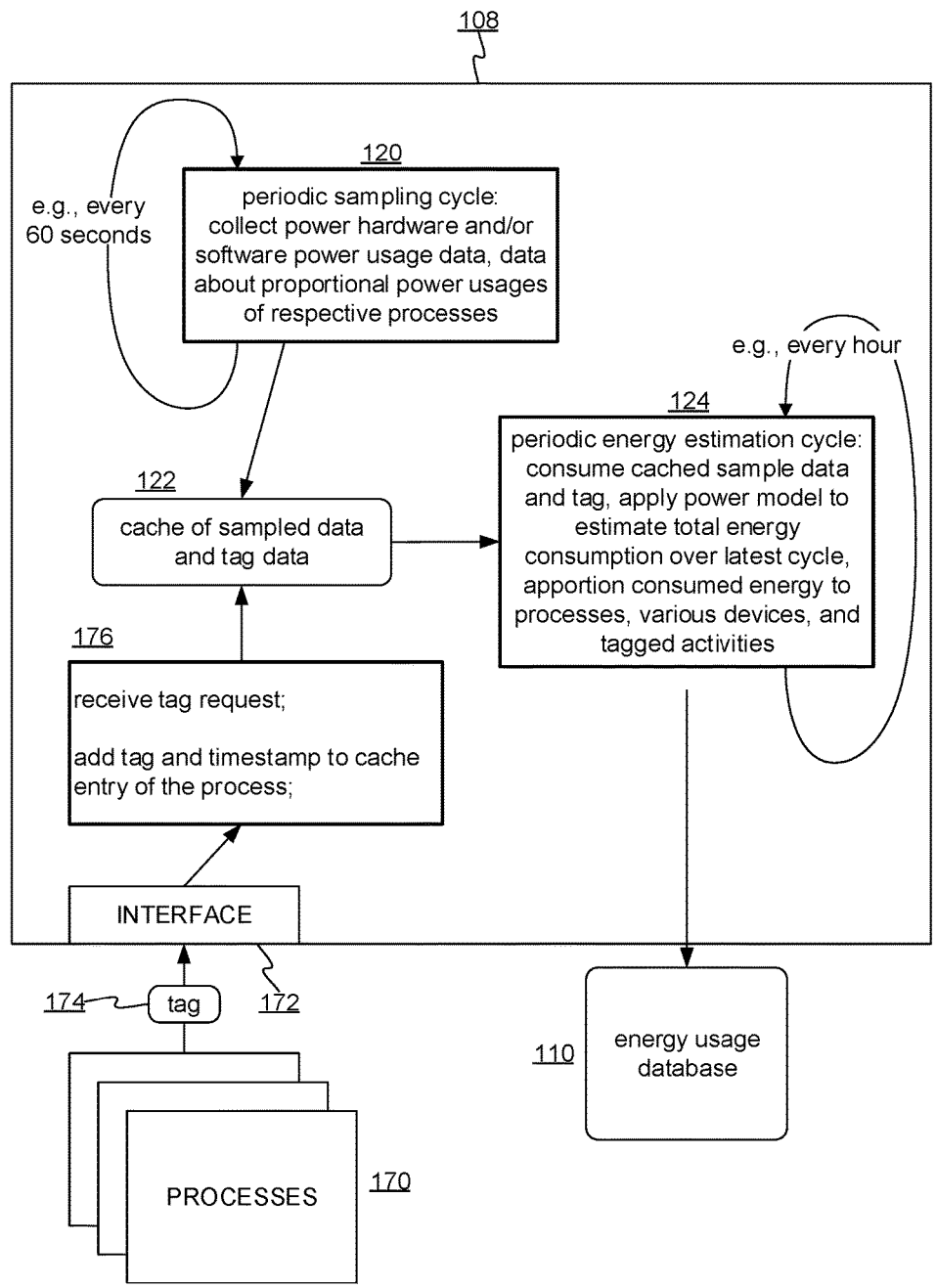
FIG. 5 shows an embodiment of the energy estimation engine that enables processes to annotate their energy consumption data with any arbitrary information about what a process is doing at any point in time.

FIG. 5 shows an embodiment of the energy estimation engine 108 that enables processes 170 to annotate the energy consumption data with any arbitrary information about what a process is doing at any point in time. Conceptually, if the energy estimation engine 108 estimates energy consumption for a process as a function of time, the process can tag that information at different points in time. This tagging is stored in association with the energy data and transferred to the aggregation service 116. Tagging data can then provide a per-tag breakdown of net energy consumptions of processes and applications.

To enable application tagging, the energy estimation engine 108 may be provided with an interface 172 through which the processes 170 may submit tag requests 174. The energy estimation engine 108 also has a tagging component 176 for handling the tag requests 174. As will be described, the cache 122, energy database 110, and the aggregation service 114 are all modified to handle tag data. The tagging component receives an incoming tag request and stores it in the cache 122

Figure 6:
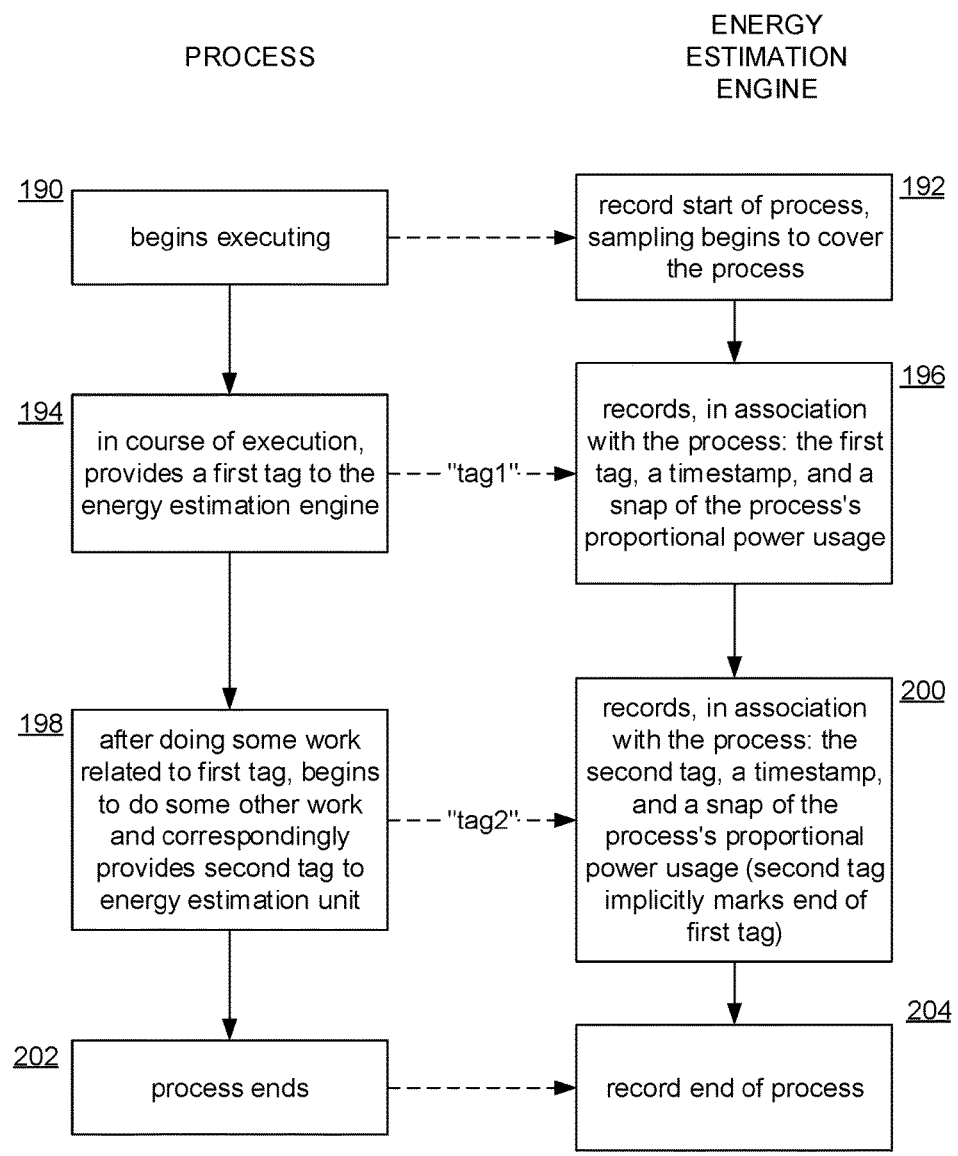
FIG. 6 shows interactions between a process (left side) and the energy estimation engine (right side).

FIG. 6 shows interactions between a process 170 (left side) and the energy estimation engine 108 (right side). Initially, the energy estimation engine 108 is executing, including generating a log of per-process energy use estimation. At step 190 the process 170 begins executing. At the first subsequent sampling cycle (step 192) the sampling process 120 detects the new process 170, adds a new cache entry for the process 170, and inserts an energy counter for the process for the recent sampling cycle. The new cache entry may be indexed by a hash of the process's process ID concatenated with a timestamp or other quasi-random data associated with the process that is combined with the process ID to form a unique identifier (considering that process IDs can be recycled). In practice, the engine may compute energy for each sampling cycle as a delta from the previous cycle. The new process will continue to be sampled and proportional energy thereof continues to be estimated periodically by the engine, regardless of any tagging. To understand energy behavior of the process, ratios of energy consumption during respective tagged periods of the process relative to the total energy use of the process may later be computed and analyzed. In addition, the estimated energy consumption of tagged periods of execution can be viewed individually, in the aggregate, or in combination with other dimensions of energy usage data (e.g., package, hardware component, etc.). In effect, tags provide a way for processes to mark time periods of their execution for later correlation with information about power use of the processes.

Returning to FIG. 6, at step 194 the process issues a tag request to the engine via the interface 172. The interface may be an application programming interface (API) exposed by the engine, an RPC client/server, or any other form of IPC. The call may be implemented by a shared/linked library. Either the process or the engine requests the engine's kernel-mode component to obtain a current energy counter for the process at the time of the tag request, which is stored in the cache. At step 196 the tagging component 176 of the engine logs the tag, energy counter, and any related data to the cache for later incorporation into the database 110. The related data may include a timestamp of the tag, an image name of the process, or any other information that might be useful for identifying the process. The related data may include other information (besides the tag and counter) that is passed from the process and stored with the logged tag. For example, the call to the interface may be designed to allow a data structure to be passed from the process to the engine. The data structure may be populated with any arbitrary information needed by the process, for instance a class identifier or a parameter of the tag.

The tag value may be any arbitrary piece of data, perhaps stored in a string. The value of the tag is determined by the process and may depend on runtime data or logic of the process. The location of a tagging/call request in the source code (and in corresponding compiled code) may be determined by the developer who writes the source code for the process. Any arbitrary process may make a tag request at any time using any arbitrary value chosen by the process. In sum, tagging is part of the logic and code of the process.

A tag is considered to continue to be in effect until the tag is submitted again or until a new tag is submitted. As shown in FIG. 6, at step 198, the process submits a second tag to the engine. The process or the engine samples the current energy counter for the process. At step 200 the tagging component 176 logs the second tag, the sampled energy counter, and any related data. If the first tag has not been explicitly terminated by the process then the second tag serves as termination of the first tag. At step 202 the process ends and the cache is updated accordingly. The process's entry in cache rolls out and lack of the process's key in the cache represents the end of the process at step 204. As can be seen, if a process does not issue any tag requests, its start, stop, and energy consumption are still estimated, albeit without any tagging thereof.

Regarding the sampling of the process's energy counter when a tag is submitted, the sample functions as an offset from the last sample computed during the last periodic (e.g., every 60 seconds) sampling cycle. This allows the subsequent periodic counter samples for the process to be computed from the offset and the subsequent periodic counter samples of the process. When a tag is closed another energy counter sample is taken. The total energy for the span of the tagged period can be determined from the offsets and the periodic samples between the start and end of the tagged period. This technique helps keep the overhead of tagging low, since only one or two more samples need to be taken.

Consider the following example. Suppose a process is a web browser. In addition, suppose the browser submits a tag for each new page visited by the browser. This will allow a developer of the browser to look at collected energy data and see which pages consume how much energy, for instance.

At time-0 (0 seconds) the browser process starts and its start is logged to the cache.

At time-5 (five seconds after the process starts) the browser opens a page for the domain "msn.com". The browser samples its energy counter which is 10, and then the browser reports (tag="msn.com", counter=10) to the engine, which the engine logs to the cache along with the time of request and any adjunct information.

At time-30 (30 seconds since the process started), the browser starts working on behalf of another domain, e.g., "cnn.com". The process's energy counter is sampled again and is 100. The browser process reports (tag="cnn.com", counter=100) to the engine, which logs the tag and counter to the cache in association with the browser process. Furthermore, for termination of the first tag, the engine logs ("msn.com", 100−10); 100−10, or 90, which is the total energy count for the process during the time from when "msn.com" was logged to the time when "msn.com" was ended.

At time-60 (60 seconds) the sampling process 120 performs its periodic duty. The counters for all processes are sampled and stored in the cache in association with the hashes/identifiers of the respective processes. The sampled counter for the browser process is 500, and the engine logs (tag="cnn.com", counter=500−100) for the browser process; 500−100, or 400, which is the energy count of the process spanning from the start of the "cnn.com" tag to time-60.

At time-90 (90 seconds) the browser starts working on behalf of domain "xyz.com". The browser process's energy counter is sampled to be 550. The process reports (tag="xyz.com", counter=550−500), or 50, which is the energy count of the process from time-60 to the time of the "xyz.com" tagging.

At this point, the cache includes at least the following tag and counter information: msn.com=90, cnn.com=400+50=450. The "xyz.com" tag is still open. The counters will be converted to actual energy estimates when the energy estimation process 124 is invoked.

As mentioned above, for components such as the CPU and perhaps others (e.g., network interface), the energy counters are temporary proxies for energy consumption. Counters associated with a process may represent CPU cycles, for instance, or some other measure of CPU work, for weights of instructions executed. When the energy estimation process 124 begins its duty cycle after an estimation period has passed (e.g., 60 minutes), the energy estimation engine converts the proxy counters to actual energy numbers. A global/total energy counter for a given component (e.g., CPU) dictates how much energy an energy counter represents for that energy estimation cycle. Given energy counters for each process, computing energy per tag is a straightforward process.

Figure 7:
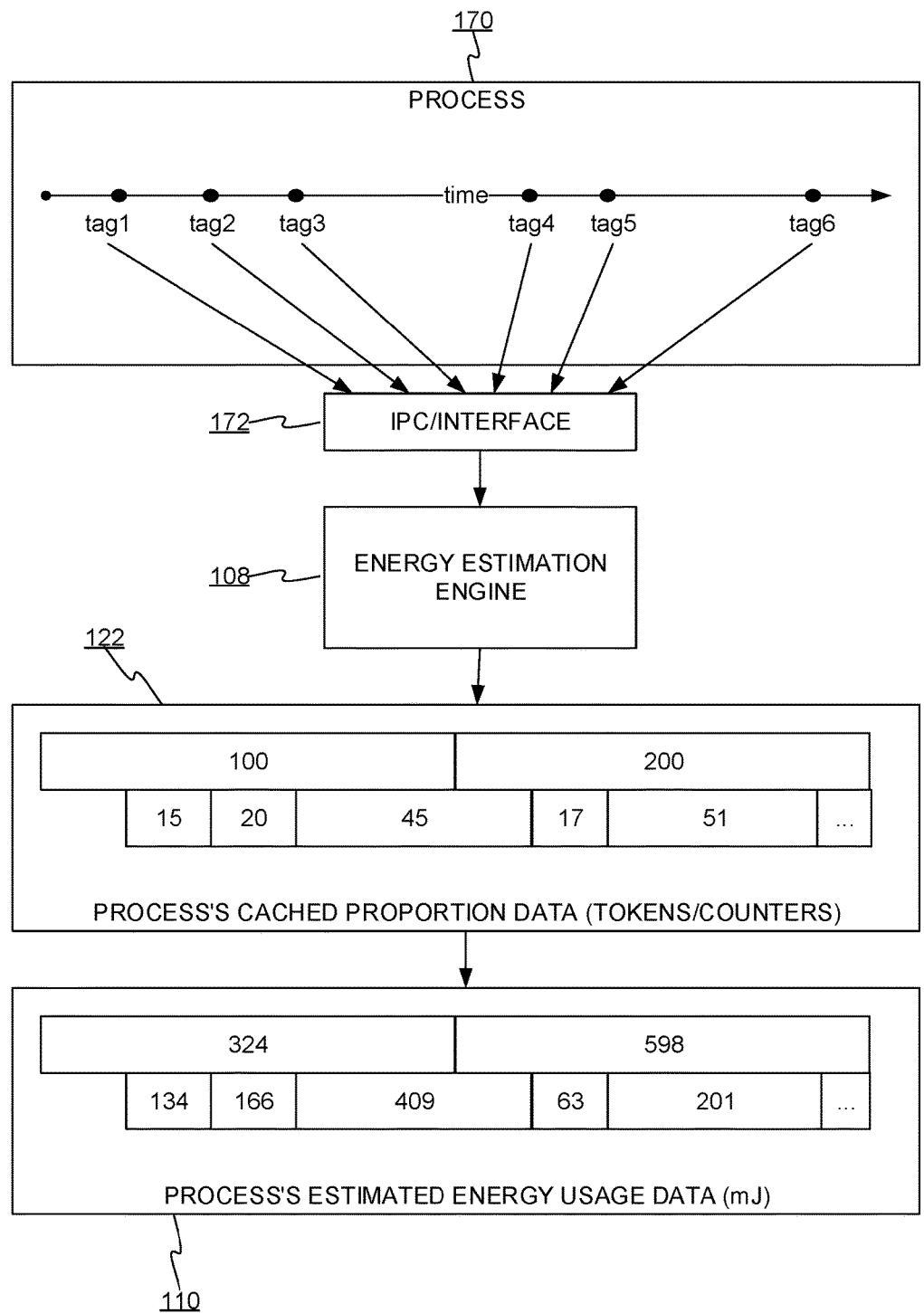
FIG. 7 shows another example of counter and energy data.
Figure 8:
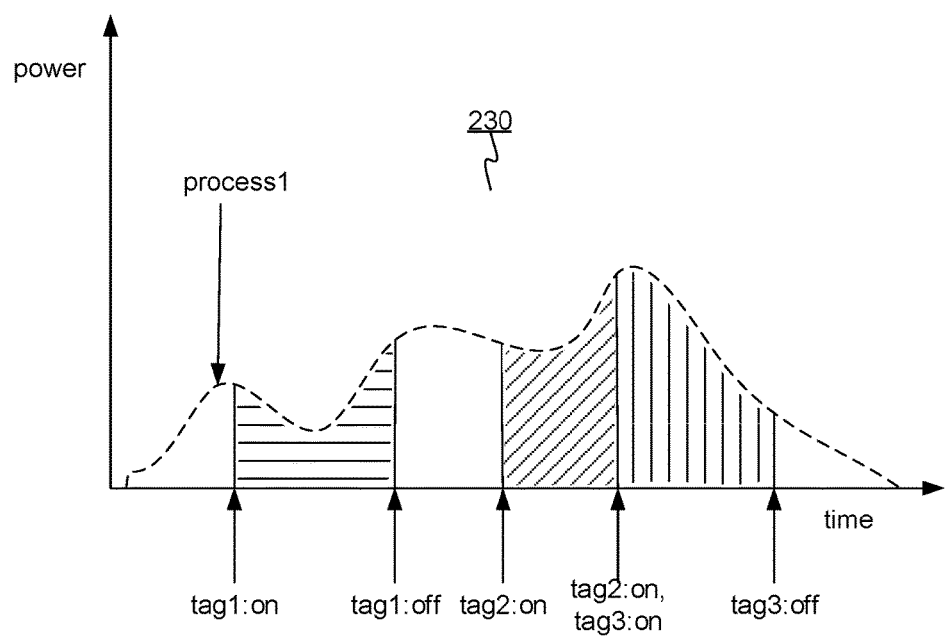
FIG. 8 shows a graph representing a tagged process.

Another thing that the engine will do at the end of an estimation period is determine if there are any open tags; such tags will be closed for accounting and then reopened again with a different energy counter. FIG. 7 shows another example of counter and energy data. At different times the corresponding process submits tags to the energy estimation engine 108. The energy estimation engine stores energy counter samples for the tags and processes in the cache 122. In FIG. 7 the process has an energy count of 100 for a first sample cycle and an energy count of 200 for a second sample cycle. When converted to actual energy, the respective time periods have energy of 324 mJ and 598 mJ. Similarly, tags have sampled counters that are converted to actual energy values during the energy estimation phase. FIG. 8 shows a graph 230 representing a tagged process. Shaded areas represent tagged periods of the process.

It should be appreciated that different techniques for logging energy consumption and tagging processes may be used. Many of the details above are designed to minimize overhead. If a different energy estimation technique is used (for instance, dedicated energy sampling hardware), direct energy sampling might be used without the need for proxy counters. If energy usages can be computed immediately, for example if a different or simpler (e.g., CPU-only) model is used, then the details of logging energy will likely differ. Whatever transparent energy logging system is used, the objective is to allow processes to tie into that system and self-annotate their energy usage logs with their own information. The level of detail captured may be altered according to overhead and other requirements or limitations. For example, only totals and durations might be tallied and start and stop times of processes and tags might be disregarded or removed by consolidation.

Description of special cases has been omitted but it will be readily apparent how these may be handled. For example, processes that terminate unexpectedly, processes with same image names but different images, and other potential conditions should be taken into account. Thread tagging may be implemented using the same technique outlined above, with some differences that will likely depend on the particular platform. For instance, threads might not be automatically logged and may instead need to "opt in" to logging by the estimation engine.

The embodiments described herein may be considered to be applicable to any type of execution unit; application packages, processes, threads, or other units of execution managed by the operating system. In one embodiment, the processes comprise executable instructions that include executable code for making tag requests (tag request instructions). The tag request instructions correspond to source code that includes system calls, methods, etc. that specify tag requests, including parameters such as a tag parameter for passing a tag value to the energy estimation engine. That is, the tag request instructions are compiled from source code having source code tag request statements (system calls, API calls, method invocations, etc.). The source code may be production-style code that does not include other code for estimating energy. Similarly, the compiled images stored on persistent media of the computing device need not be instrumented or modified to include additional instructions or overhead for estimating energy. All that is necessary to tag energy estimates is for a developer to include the appropriate tagging calls/statements in their source code. The developer chooses where in the code tagging will occur and possibly parameters such as a tag value/label, informational parameters, etc. The source code is compiled in ordinary fashion without requiring insertion of special instrumentation code/instructions or other overhead. Tagging and energy estimation may be performed in production settings with negligible overhead.

Other techniques might be used to keep logging and tagging overhead low. For example, because the number of processes that have executed can be prolific, the cache could start to become excessively large if data for each process is stored. The entries in the cache and or database might be ordered by total energy and only the N topmost energy consuming processes may be retained. Adjustments may be needed to keep long-running low-energy processes from falling out of view.

Figure 9:
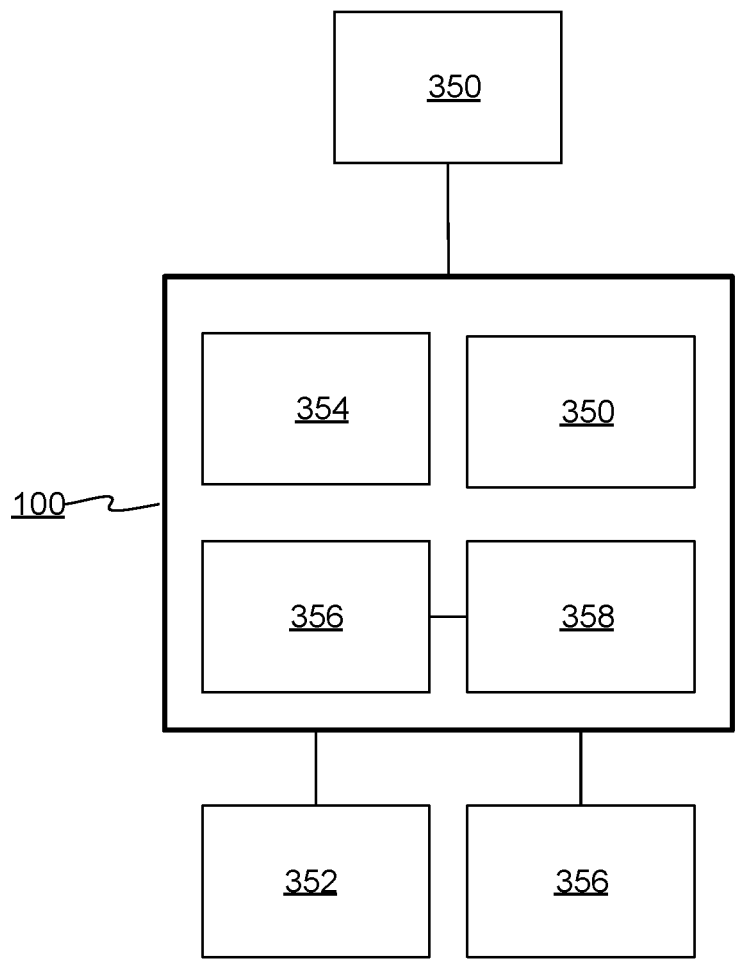
FIG. 9 shows details of the computing device on which embodiments may be implemented.

FIG. 9 shows details of the computing device 100 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 100 to implement any of the features or embodiments described herein.

The computing device 100 may have one or more displays 350, a network interface 354 (or several), as well as storage hardware 356 and processing hardware 358, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 356 may be any combination of magnetic storage, static memory, volatile memory, non-volatile memory, optically or magnetically readable matter, etc. The meaning of the terms "storage" and "storage hardware", as used herein does not refer to signals or energy per se, but rather refers to physical apparatuses and states of matter. The hardware elements of the computing device 100 may cooperate in ways well understood in the art of machine computing. In addition, input devices may be integrated with or in communication with the computing device 100. The computing device 100 may have any form-factor or may be used in any type of encompassing device. The computing device 100 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 358. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device, the method comprising:
   executing an operating system, the operating system managing the execution of arbitrary processes;
   repeatedly obtaining timestamped estimates of energy consumptions of the respective arbitrary processes and storing corresponding energy information, the energy information comprising process identifiers of the respective arbitrary processes stored in association with the respective timestamped estimates of energy consumption of the arbitrary processes, each process having a respective set of timestamped estimates associated therewith by its corresponding process identifier, the timestamped estimates having been computed based on obtained allotments of processor resources of the computing device for execution of the respective arbitrary processes;
   providing an application programming interface (API) on the computing device, and while executing the arbitrary processes, receiving tag requests associated with the estimating energy consumption, the tag requests submitted to the API by the arbitrary processes when executing, each tag request comprising a respective tag identifier determined by the corresponding process;
   responding to a tag request received by the API by determining a tagged energy consumption estimate, the tagged energy consumption estimate estimated for a period of execution of whichever process submitted the tag request, a start of the period corresponding to receipt or generation of the tag request; and
   storing the tag identifier of the tag request and the tagged energy consumption estimate in the energy information, the tag identifier and the tagged energy consumption estimate both stored in association with the process identifier of whichever process submitted the tag request.

2. A method according to claim 1, wherein the estimating is performed by a model implemented by the computing device that models power supplied to, and used by, one or more hardware components of the computing device.

3. A method according to claim 1, wherein each time a new process begins being executed by the operating system, based thereon, beginning to estimate energy consumption of the new process.

4. A method according to claim 1, wherein the estimating and the determining the tagged energy consumption estimate are performed by an energy estimation engine executing on the computing device, the energy estimation engine comprising an interface through which the arbitrary processes submit the tag requests to the energy estimation engine.

5. A method according to claim 4, wherein the obtained allotments are obtained by the energy estimation engine and correspond to information, received and used by the energy estimation engine, indicating processor utilization.

6. A method according to claim 1, further comprising receiving second tag requests from some of the arbitrary processes, wherein the second tag requests terminate the periods of some of the respective tag requests based on having same tags as the terminated tag requests, and wherein terminating a period also determines the corresponding tagged energy consumption estimate thereof.

7. A method according to claim 1, further comprising transmitting the energy information via a network to an aggregation service that receives energy information from other computing devices, aggregates the energy information from the computing device and the other computing devices, and presents the aggregated energy information for querying over the network.

8. A computing device comprising:
processing hardware;
storage hardware storing an operating system, executable images executable by the processing hardware and when loaded by the operating system executed as processes managed by the operating system;
the storage hardware further storing information configured to cause the processing hardware to perform an energy estimating process comprising:
providing an application programming interface (API);
executing the operating system;
beginning, by the operating system, execution of a process managed by the operating system, wherein beginning execution of the process comprises creating the process by loading a corresponding executable image from the storage hardware;
terminating the process by the operating system;
receiving, via the API, tag requests from the process, each tag request comprising a respective tag value;
estimating first amounts of energy consumed by the process for respective periods that begin with the tag requests; and
storing the first amounts in association with an identifier that identifies the process and in association with the tag value.

9. A computing device according to claim 8, wherein the energy estimating process further comprises receiving, from the process, a tag request comprised of a tag value, determining that the tag value corresponds to a tag value from a prior tag request, and, based on the determining, estimating the corresponding first amount of energy for a period from the prior tag request to the tag request.

10. A computing device according to claim 8, wherein the storage hardware further stores an energy estimation engine configured to repeatedly sample hardware for power information and based thereon, estimate energy consumptions of processes during respective time slices, wherein the repeated sampling is transparent to, and not controlled by, the processes.

11. A computing device according to claim 8, wherein the energy estimating process further comprises receiving indicia of proportional usages of the processing hardware from the processing hardware and estimating the energy consumptions by the processes according to the proportional usages.

12. A computing device according to claim 8, wherein the energy estimating process further comprises storing, in association with the process identifier, a filesystem image name of the image and/or an identifier of a package corresponding to the image.

13. A computing device according to claim 8, wherein the tag request is received from the process via an interprocess communication mechanism.

14. A computing device according to claim 8, wherein the energy estimating process further comprises automatically estimating a second amount of energy consumed by the process from the beginning of the process to the termination of the process and storing the second amount of energy in association with the identifier of the process.

15. A computing device according to claim 8, wherein the energy estimating process further comprises storing energy counters in a cache and converting the energy counters into estimated values of actual energy use.

16. A method performed by a computing device, the method comprising:
executing processes by an operating system, the processes comprising tag request instructions configured to submit tag requests to an application programming interface (API) on the computing device;
automatically computing estimates of energy consumed by the processes based on power and or processing measures received from hardware of the computing device, wherein each estimate is of energy consumed only by a corresponding process, wherein consumed energy is estimated for processes being executed by the operating system;
issuing tag requests by executing the tag instructions when executing the processes, each tag request invoking the API;
for each tag request issued by a process to the API, based thereon, computing a tagged estimate of energy consumed by the process for a period of time determined by the tag request; and
storing the estimates of energy consumed by the processes in association with respective identifiers of the processes, and storing the tagged estimates of energy in association with the identifiers of whichever of the processes submitted the tag requests.

17. A method according to claim 16, wherein the tag requests comprise respective tag labels determined by the processes, and wherein the method further comprises storing the tag labels in association with the identifiers.

18. A method according to claim 16, further comprising receiving power measures from a power source of the computing device and computing the estimates and the tagged estimates based on the power measures.

19. A method according to claim 16, wherein the processes are loaded by the operating system from corresponding executable images stored on storage hardware of the computing device, and wherein the images comprise the tag request instructions, whereby the processes comprise the tag request instructions by virtue of being loaded from the executable images.

20. A method according to claim 16, further comprising computing a tagged estimate based on a period defined by a tag request and termination of a corresponding process.

* * * * *